United States Patent [19]

Tsutsumi et al.

[11] Patent Number: 5,441,457
[45] Date of Patent: Aug. 15, 1995

[54] TENSIONER HAVING RESERVOIR COVER PLATE

[75] Inventors: Kazuhiko Tsutsumi, Nagoya; Masaaki Takahashi, Hidaka; Sadao Miki, Isehara, all of Japan

[73] Assignee: Tsubakimoto Chain Co., Osaka, Japan

[21] Appl. No.: 323,143

[22] Filed: Oct. 14, 1994

[30] Foreign Application Priority Data

Oct. 15, 1993 [JP] Japan .................. 5-060387 U

[51] Int. Cl.⁶ .............................................. F16H 7/00
[52] U.S. Cl. ................................................... 474/110
[58] Field of Search ................ 474/101, 109–111, 474/113–117, 133–138

[56] References Cited

U.S. PATENT DOCUMENTS

| | | |
|---|---|---|
| 4,708,696 | 11/1987 | Kimura et al. . |
| 4,909,777 | 3/1990 | Inoue et al. .................. 474/110 |
| 5,087,225 | 2/1992 | Futami et al. . |
| 5,090,946 | 2/1992 | Futami et al. . |
| 5,181,889 | 1/1993 | Maruyama et al. . |
| 5,193,498 | 3/1993 | Futami . |
| 5,234,383 | 8/1993 | Harada et al. . |
| 5,352,159 | 10/1994 | Suzuki et al. .................. 474/110 |

Primary Examiner—Michael Powell Buiz
Attorney, Agent, or Firm—Howson & Howson

[57] ABSTRACT

In an oil-operated tensioner, oil from s reservoir formed in the tensioner housing passes through a check valve to a chamber behind a spring-urged plunger, which protrudes from the housing to maintain tension in a chain or belt. Instead of the usual press-fit cup for closing the opening of the reservoir, a flat or convex cover plate is fixed to the housing for closing the opening in the reservoir.

3 Claims, 5 Drawing Sheets

TENSIONER HAVING RESERVOIR COVER PLATE

BRIEF SUMMARY OF THE INVENTION

This invention relates generally to tensioners of the kind used in endless chains and belt drive systems, and more particularly to improvements in oil-operated tensioners of the kind used to maintain tension in camshaft drive systems for internal combustion engines.

A typical camshaft drive system for an internal combustion engine comprises a synchronizing or timing chain connecting the sprockets of a crank and a cam in driving relationship so that the cam is rotated to operate the valves of the engine. To maintain proper timing operation of the valves and reduce noise, it is necessary to suppress slackening of the timing chain.

In a conventional oil-operated tensioner for eliminating slack in the timing chain or belt of an internal combustion engine, oil is supplied to a reservoir in the tensioner by a pump driven by the engine. In the tensioner, a plunger, protruding from a cylinder in an engine-mounted housing, is urged outwardly by a spring located inside the housing to impart tension to the timing chain. Oil is permitted to flow freely into the cylinder from the reservoir through a check valve as the plunger extends, but its return flow is restricted. Thus, the plunger can extend readily to take up slack, but retracts only slowly. This action of the tensioner maintains proper tension in the timing chain or belt.

The reservoir is typically in the shape of a cavity formed as an integral part of the housing and having an opening to the exterior of the housing. The reservoir is typically closed by a cup-shaped plug, press-fit into the opening.

There are several drawbacks to oil-operated tensioners of the kind described above. First, the cup-shaped plug substantially reduces the volume of the reservoir and limits its capacity for oil. Second, the oil supply is introduced into the tank through a port formed below the lower surface of the plug. Consequently, while the engine is running, the oil level in the reservoir stays at the bottom surface of the plug. However, when the engine stops, the surface of the oil in the reservoir drops to the level of the lowest part of the oil supply port. Thus, the available oil capacity in the reservoir is seriously limited. Third, mating surfaces of the plug and the opening of the reservoir must be circular in order to allow a press-fit. Caulking must also be added to insure the plug remains in place.

Accordingly, it is an object of the present invention to provide an improved tensioner for an endless chain or belt drive system in which there is more space to accommodate oil and improved efficiency in overall operation and ease in manufacture.

Briefly, the invention provides an improved tensioner in which an oil reservoir, formed as a hollow space in the housing, is covered by flat or convex plate.

In the case of the flat plate, oil is supplied to the reservoir through an oil supply bore in the housing. Since the reservoir is covered by the plate, oil pressure within the reservoir and the plunger chamber together with the force exerted by a spring within the plunger chamber, imparts tension to a chain or belt. Because the plate is flat and fixed on the outer surface of the housing, the reservoir has a volume equal to that of the hollow space within in the housing. Thus, the oil capacity of the tensioner is greater than that of a conventional tensioner of similar size.

A recess may be formed in the housing on the same side of the housing on which the reservoir has its opening. The recess is connected to the oil supply port and the reservoir, and the recess and reservoir are both covered by the flat plate. Thus, not only can more oil be accommodated than in the conventional reservoir, but the oil supply passage is more easily fabricated.

A small hole may be provided in the flat cover plate in order to scavenge air from the oil reservoir into the atmosphere. Alternatively, the lower surface of the cover plate may include a groove providing communication between the inside of the reservoir and the atmosphere while the plate is attached to the housing. In some cases, a clearance between the plate and the housing is inherently provided by the roughness of the mating surfaces of the plate and housing, eliminating the need for the hole or groove.

In the case of the convex cover plate, as in the case of the flat cover plate, oil is supplied to the reservoir through an oil supply bore. Oil pressure within the reservoir and the plunger chamber together with the force exerted by a spring within the plunger chamber, imparts tension to a chain or belt. The cover plate, fixed to the outer surface of the housing with its concave side facing the interior of the reservoir, affords a volume in the reservoir tank equal to the reservoir space formed within the housing plus the volume of the concave portion of the cover plate. Thus, the reservoir and the concave portion of the cover plate accommodate more oil than is accommodated in the reservoir of a conventional tensioner.

A passageway may be formed, either by the convex cover plate itself or by forming a recess in the exterior of the tensioner housing, to connect the opening of the oil supply port with the interior of the cover plate. This also simplifies the fabrication of the oil supply passage.

Air may easily be scavenged from within the oil reservoir and the cover plate by providing a small hole in the upper portion of the protruding plate.

Normally, bolts protrude from the surface of the housing, and space near them is not utilized. In case the convex cover plate is bolted to the housing, it is preferable that the amount by which the plate protrudes from the housing surface be less than that the amount by which the heads of the fastening bolts protrude from the housing surface. By accommodating the convex plate within the space near the bolts, effective utilization of dead space becomes possible, and greater freedom is provided for laying out various peripheral devices.

Various other objects, advantages and details of the invention will be apparent from the following detailed description, when read in conjunction with the drawings.

DETAILED DESCRIPTION

Figure 9:
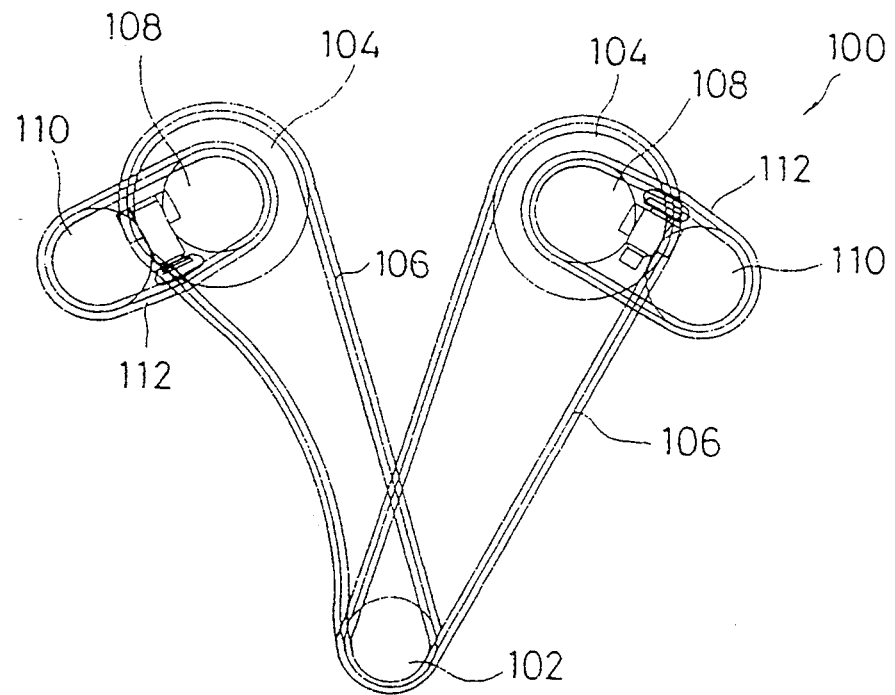
FIG. 9 is a front view of a conventional camshaft drive system for an internal combustion engine with oil-operated tensioners applying tension to the synchronizing chains.

Referring now to the drawings wherein like referenced characters designate like or corresponding parts throughout the several views, there is illustrated in FIG. 9 a camshaft driving system 100 for an internal combustion engine with dual overhead camshafts. Driving system 100 comprises a crank sprocket 102 and cam sprockets 104 with synchronizing or timing chains 106 respectively connecting the crank sprocket 102 in driving relationship with cam sprockets 104. Additional synchronizing or timing chains 112 also connect cam sprockets 108, which are directly connected with sprockets 104, in driving relationship with cam sprockets 110. In order to maintain proper timing of valve operation and to reduce noise, tensioners 120 are provided to suppress slack in timing chains 112. While not shown, similar tensioners 120 may also be applied in like manner to timing chains 106.

Figure 10:
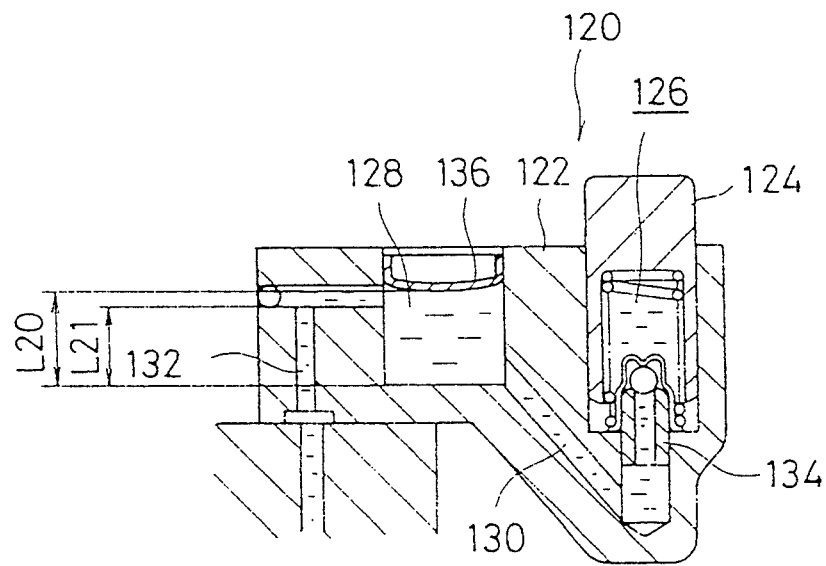
FIG. 10 is a sectional view showing a typical tensioner in accordance with the prior art.

FIG. 10 represents a conventional tensioner 120 suitably mounted on an engine block. A plunger 124 is slidable in a cylinder formed in a housing 122, and projects outwardly from the housing to imparting tension to an endless chain or belt. The plunger is urged in the outward direction by a coil spring located inside the plunger, and also by pressure of oil located in a chamber 126. A reservoir 128, formed in the housing, provides oil through a passageway 130 and a ball check valve 134 to oil chamber 126. Valve 134 allows oil to flow into chamber 126 freely, while blocking reverse flow.

A cup-shaped plug 136 covers an opening at the top of reservoir 128.

The internal wall of reservoir 128 is machined by grinding so that the plug 136 can be press fit into place. Caulking (not shown) is typically placed around the plug to hold it in place.

As shown in FIG. 10, while the engine is running, and oil is supplied to reservoir 128 by the oil pump (not shown), the oil level is at L20. However, when the engine stops, the supply of oil is discontinued and the oil level drops to L21.

Prior art tensioners of the kind shown in FIG. 10 have a number of drawbacks which, as will become apparent hereinafter, have been ameliorated in the present invention.

Figure 1:
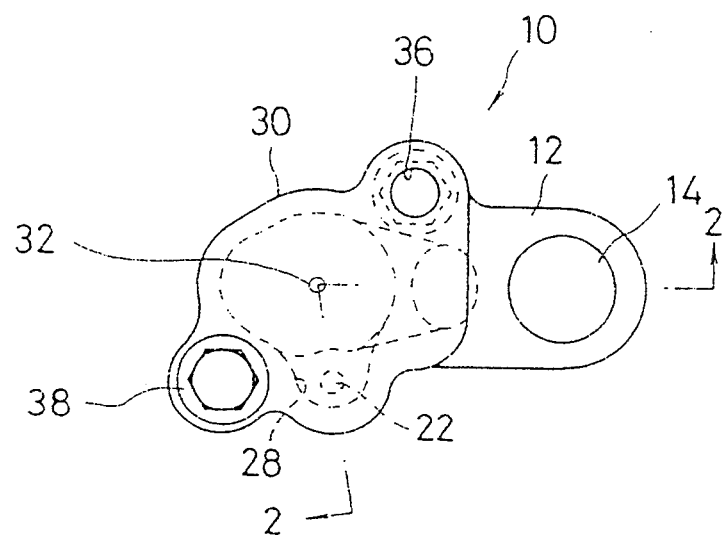
FIG. 1 is a plan view of a first embodiment of a tensioner according to the invention.
Figure 2:
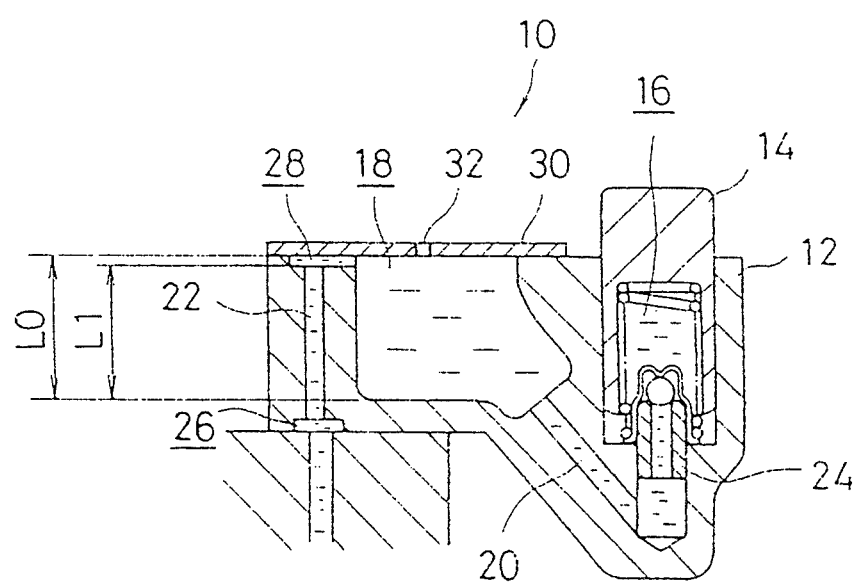
FIG. 2 is a transverse section of the first embodiment taken on surface 2—2 of FIG. 1.
Figure 3:
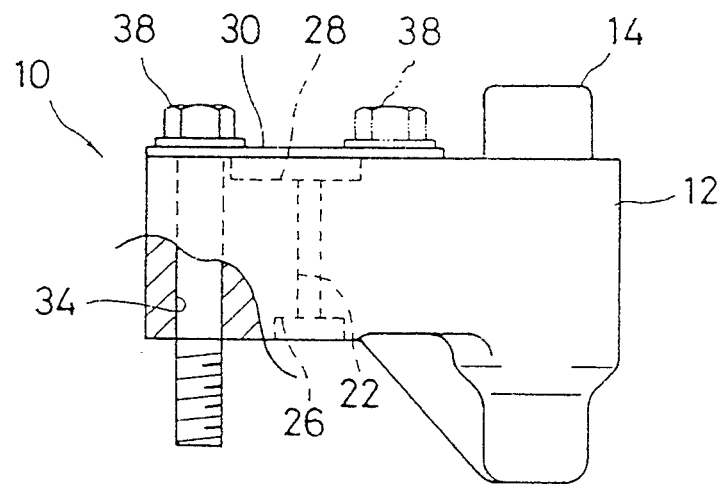
FIG. 3 is partially broken-away front elevation of the tensioner of FIG. 1.

Referring now to FIGS. 1-3, which illustrate a first embodiment of the invention, a tensioner 10, mounted on an engine block, comprises a plunger 14 protruding from a housing 12, an oil chamber 16 formed within plunger 14, a reservoir 18 formed in housing 12, an oil passage 20 communicating between reservoir 18 and chamber 16, and an oil supply conduit 22, formed in housing 12 and communicating with reservoir 18. A ball check valve 24 allows oil to flow into chamber 16 while blocking flow out of chamber 16.

As shown in FIG. 1, the opening in reservoir 18 has a non-circular section substantially congruent with the profile of housing 12. As shown in FIG. 2, toward the bottom of the reservoir 18, the reservoir expands in a direction toward oil chamber 16. The housing 12 is normally formed as a casting. While the cylindrical internal wall of the bore accommodating plunger 14 must be ground in order to enable smooth sliding of plunger 14, there is no need to grind the internal wall of reservoir 18.

Oil supply conduit 22 extends through housing 12 between the top and bottom sides of the housing, and terminates with a recess 26 on the bottom side adjacent to the engine block, and a recess 28 on the top side of the housing. Bore 22 communicates with an oil port in the engine block through a recess 26, and communicates with the inside of reservoir 18 though a recess 28.

A flat cover plate 30 is fixed to housing 12. The cover plate 30 covers both the opening of the reservoir 18 and recess 28. A small hole 32 in cover plate 30 is provided to scavenge air from tank 18.

As shown in FIGS. 1 and 3, tensioner 10 is fixed to the engine block by two bolts 38, which extend through holes 34 of housing 12 and corresponding holes 36 in plate 30 (FIG. 1), which are aligned with holes 34 in the housing. Thus, the bolts 38 serve the dual purposes of securing the tensioner housing to the engine block and securing the plate 30 to the tensioner housing.

The quantity of oil which can be accommodated in tank 18 is greater than in a conventional tensioner because the shape of the reservoir 18 is considerably less limited, and higher oil levels are permissible. As noted above, housing 12 may be made of a casting because there is no need to grind the internal wall of reservoir 18. Cover plate 30 is simply placed on the top of housing 12 as thee is no need to press fit it into the reservoir opening.

As shown in FIG. 2, when oil is supplied to tank 18 while the engine is operating, the height of the oil surface is at level L0; and as the engine stops and the supply of oil is discontinued, the oil surface drops to level L1, which is higher than the level L21 in the prior art shown in FIG. 10.

Figure 4:
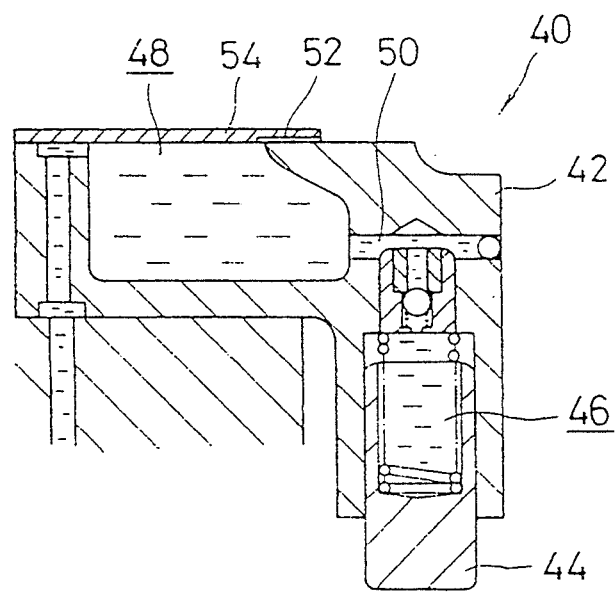
FIG. 4 is a transverse section of a tensioner according to a second embodiment the invention.

Whereas, in the embodiment illustrated in FIGS. 1-3, plunger 14 and cover plate 30 are located on the same side of the housing, in the embodiment of FIG. 4, a plunger 44 protrudes from the side of a housing 42 opposite to the side on which a flat reservoir cover plate 54 is located. An oil passage 50, within housing 42, is also arranged differently to provide communication between the reservoir 48 and an oil chamber 46. A groove 52, formed on the underside of plate 54, extends across an edge of the reservoir opening and provides an air scavenging opening, which performs the same function as hole 32 in the tensioner of FIG. 2. The remaining tensioner structure is substantially the same as that of the tensioner of FIGS. 1-3.

Figure 5:
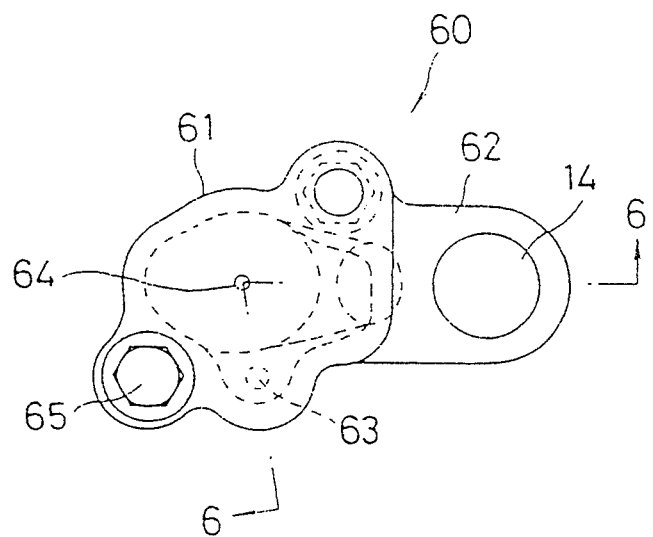
FIG. 5 is a plan view of a tensioner according to a third embodiment of the invention.
Figure 6:
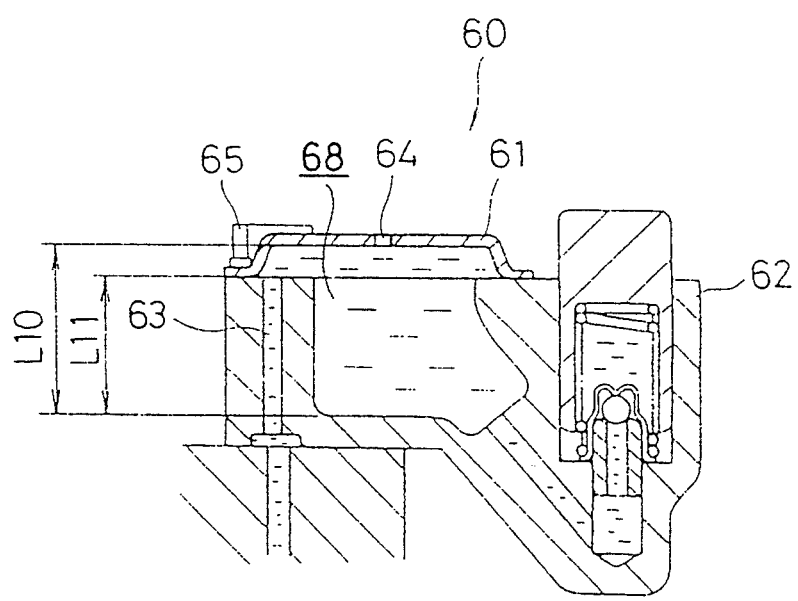
FIG. 6 is a transverse section of the third embodiment taken on surface 6—6 of FIG. 5.

FIGS. 5 and 6 illustrate still another embodiment of the invention, the principal difference from the tensioners of FIGS. 1-4 being the use of a bulging plate 61 and the structure incidental thereto. Plate 61 has a convex outer face and a concave inner face, so that it protrudes from the surface of housing 62. The plate 61 covers the opening of a reservoir formed in the housing 62. It also covers the opening of a oil supply bore 63. Oil is accommodated both by the reservoir 68 and by the concave portion of the plate 61. Unlike the tensioners of FIGS. 1-4, the tensioner of FIGS. 5 and 6 needs no recesses at the outlet of bore 63. However, a small hole 64 is provided in plate 61 for scavenging air.

Plate 61 is secured to housing 62 by bolts 65. The amount by which plate 61 protrudes from housing 62 is less than the amount by which bolts 65 protrude from the housing. With this arrangement, the dead space usually existing between protruding bolts is effectively utilized.

As shown in FIG. 6, when oil is supplied to the reservoir 68 while the engine is operating, the level of the oil is at L10. When the engine stops and the supply of oil is discontinued, the level drops to L11, which is lower than level L10, but nevertheless even higher than level L1 in the embodiment of FIG. 2. Thus, the convex plate 61 of FIGS. 5 and 6 provides a larger space for accommodating oil than is provided in the tensioners of FIGS. 1–4.

Figure 7:
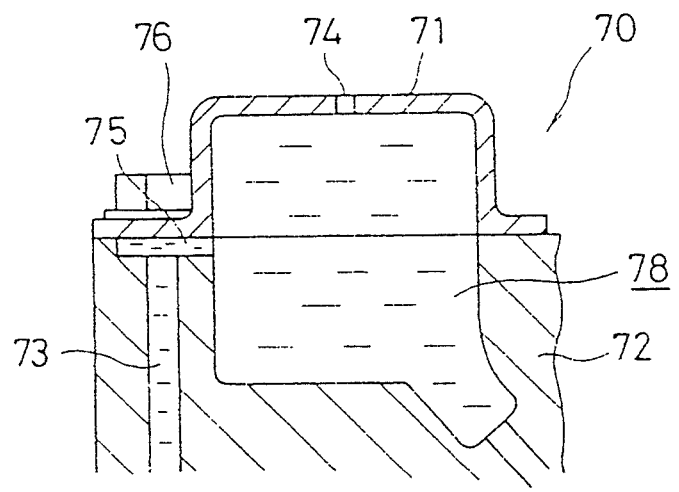
FIG. 7 is a fragmentary sectional view of a tensioner according to a fourth embodiment of the invention.

Tensioner 70, shown in FIG. 7, represents a fourth embodiment according to the invention. It differs from the first embodiment of FIGS. 1–3 both in the configuration of plate 71 and in the incidental structure. Cover plate 71 is hollow having a convex outer face protruding from the surface of housing 72, and a concave inner face, facing toward the interior of the reservoir 78. Plate 71 is adapted to cover the opening of the reservoir. In this embodiment, as in the embodiment of FIGS. 5 and 6, oil is accommodated not only in the reservoir but also in the hollow portion of the cover plate. As in the first and second embodiments, a recess 75 is formed at the end of oil supply bore 73 to supplies oil to reservoir 78 when plate 71 is secured to housing 72. A small hole 74 in cover plate 71 provides for the scavenging of air. If there are no structural limitations in the vicinity of bolts 76, which secure plate 71 to housing 72, the cover plate 71 may protrude further from housing 72 than bolts 76 to provide a large capacity for oil.

Figure 8:
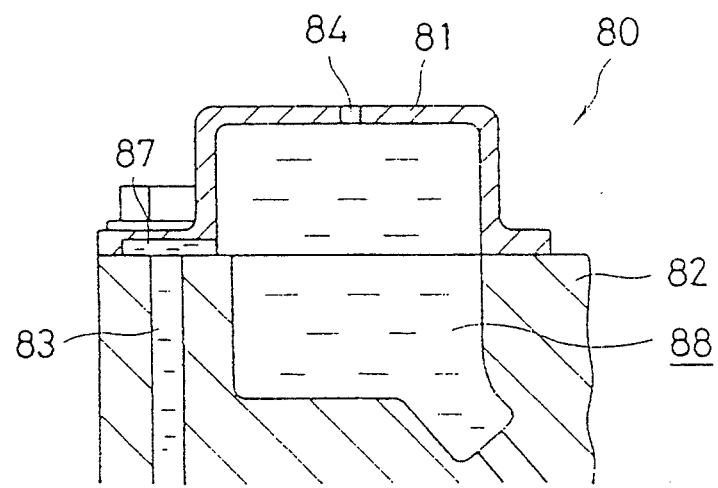
FIG. 8 a fragmentary sectional view of a tensioner according to a fifth embodiment of the invention.

FIG. 8 illustrates a tensioner 80 according to a fifth embodiment of the invention. Cover plate 81 has a hollow shape with a convex outer face and a concave inner face, so that it protrudes from the surface of housing 82. Plate 81 covers the opening of reservoir of 88 so that oil is accommodated not only by reservoir 88 but also in the concave interior portion of plate 81. A recess 87, formed in plate 81, connects the oil supply bore 83 with reservoir 88. Unlike the first, second and fourth embodiments, this embodiment has no recesses at the top of the oil supply conduit 83. A small hole 84 in cover plate 81 provides for scavenging of air.

The many advantages of the invention should now be readily apparent. For example, none of the embodiments of the invention requires the cover plate to be press-fit into the reservoir. Consequently, the opening to the reservoir is not limited to a circle, and grinding or other special machining steps to form the opening of the reservoir are unnecessary. The housing may be used as cast, and no caulking is required. Consequently, the efficiency of manufacture and assembly of the tensioner is improved. In addition, because covering the reservoir by a flat plate is structurally very simple, the effective oil capacity of the reservoir may be easily and inexpensively increased, with a resultant improvement in the performance of the tensioner.

Further improvements in oil accommodating capacity may be achieved in accordance with the invention by the use of a convex cover plate, and the convex cover plate can be arranged to take advantage of what would otherwise be unusable space between mounting bolts.

It will be understood that various changes in the details, materials, steps and arrangement of parts, which have been herein described and illustrated in order to explain the nature of the invention, may be made by those skilled in the art within the principle and scope of the invention as expressed in the appended claims.

We claim:

1. An improved oil-operated tensioner comprising a housing having an oil reservoir formed therein, said reservoir having an opening, a plunger protruding from the housing and forming an oil chamber with said housing, means urging the plunger in a direction such that it protrudes further from the housing, means providing an oil passage from said oil reservoir to said chamber, and means providing a passage for supplying oil to said reservoir, the improvement comprising a flat plate fixed to the housing and covering the opening of the reservoir.

2. An improved oil-operated tensioner comprising a housing having an oil reservoir formed therein, said reservoir having an interior and an opening to the exterior of the housing, a plunger protruding from the housing and forming an oil chamber with said housing, means urging the plunger in a direction such that it protrudes further from the housing, means providing an oil passage from said oil reservoir to said chamber, and means providing a passage for supplying oil to said reservoir, the improvement comprising a plate fixed to said housing and covering the reservoir opening, the plate having convex and concave faces, and the concave face of the plate being disposed in facing relationship to the interior of the reservoir.

3. The improvement according to claim 2 further comprising a bolt, and in which the plate is fixed to the housing by the bolt, said bolt having a head which protrudes from the housing an amount greater than the amount by which the convex face of the plate protrudes from the housing.

* * * * *